미국009729203B2

(12) United States Patent
Park et al.

(10) Patent No.: US 9,729,203 B2
(45) Date of Patent: Aug. 8, 2017

(54) RESONATOR HAVING INCREASED ISOLATION

(71) Applicant: Samsung Electronics Co., Ltd., Suwon-si (KR)

(72) Inventors: Jae Hyun Park, Yongin-si (KR); Dong Zo Kim, Yongin-si (KR); Sang Wook Kwon, Seongnam-si (KR); Ki Young Kim, Yongin-si (KR); Nam Yun Kim, Seoul (KR); Bong Chul Kim, Seoul (KR); Yun Kwon Park, Dongducheon-si (KR); Keum Su Song, Seoul (KR); Chi Hyung Ahn, Suwon-si (KR); Young Ho Ryu, Yongin-si (KR); Chang Wook Yoon, Seoul (KR); Byoung Hee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 14/161,331

(22) Filed: Jan. 22, 2014

(65) Prior Publication Data
US 2014/0203895 A1 Jul. 24, 2014

(30) Foreign Application Priority Data
Jan. 22, 2013 (KR) .......................... 10-2013-0006817

(51) Int. Cl.
*H04B 5/00* (2006.01)
*H01P 7/00* (2006.01)

(52) U.S. Cl.
CPC ............. *H04B 5/0037* (2013.01); *H01P 7/00* (2013.01); *H04B 5/00* (2013.01)

(58) Field of Classification Search
CPC .. H03H 7/0115; H01P 3/08; H01P 7/00; H02J 17/00; H04B 5/0037
USPC ... 333/219, 219.2, 175, 185, 24 R, 230, 227
See application file for complete search history.

(56) References Cited

U.S. PATENT DOCUMENTS

| 5,351,023 A * | 9/1994 | Niiranen ................. H01P 7/005 333/202 |
| 5,689,221 A * | 11/1997 | Niiranen ................. H01P 1/205 333/202 |
| 6,122,533 A * | 9/2000 | Zhang ................. H01P 1/20372 333/204 |
| 6,828,882 B2 * | 12/2004 | Hidaka ................. H01P 1/2039 333/161 |
| 2004/0000974 A1 | 1/2004 | Odenaal et al. |

(Continued)

FOREIGN PATENT DOCUMENTS

| KR | 10-2010-0070690 A | 6/2010 |
| KR | 10-2011-0037732 A | 4/2011 |

(Continued)

*Primary Examiner* — Benny Lee
*Assistant Examiner* — Hafizur Rahman
(74) *Attorney, Agent, or Firm* — NSIP Law

(57) ABSTRACT

A resonator having increased isolation includes a first resonator having first characteristics, and configured to resonate with another resonator having the first characteristics; and a second resonator having second characteristics, and configured to resonate with another resonator having the second characteristics; wherein the resonator has an arrangement and a structure that minimizes a coupling between the first resonator and the second resonator.

12 Claims, 18 Drawing Sheets

(56) References Cited

U.S. PATENT DOCUMENTS

| | | | |
|---|---|---|---|
| 2008/0169910 A1* | 7/2008 | Greene | H02J 17/00 340/10.34 |
| 2010/0190436 A1 | 7/2010 | Cook et al. | |
| 2012/0153735 A1 | 6/2012 | Karalis et al. | |

FOREIGN PATENT DOCUMENTS

| | | |
|---|---|---|
| KR | 10-2011-0048567 A | 5/2011 |
| KR | 10-2011-0067610 A | 6/2011 |
| KR | 10-2011-0135539 A | 12/2011 |
| KR | 10-2012-0071626 A | 7/2012 |
| KR | 10-2012-0071769 A | 7/2012 |

* cited by examiner

→ Input current
----→ Induced current

RESONATOR HAVING INCREASED ISOLATION

CROSS-REFERENCE TO RELATED APPLICATIONS

This application claims the benefit under 35 USC 119(a) of Korean Patent Application No. 10-2013-0006817 filed on Jan. 22, 2013, in the Korean Intellectual Property Office, the entire disclosure of which is incorporated herein by reference for all purposes.

BACKGROUND

1. Field

The following description relates to a wireless power transmission system.

2. Description of Related Art

Wireless power is energy that is transmitted from a wireless power transmitter to a wireless power receiver via magnetic coupling. Accordingly, a wireless power charging system includes a source device and a target device. The source device wirelessly transmits power, and the target device wirelessly receives power. The source device may be referred to as a wireless power transmitter, and the target device may be referred to as a wireless power receiver.

The source device includes a source resonator, and the target device includes a target resonator. Magnetic coupling or resonant coupling occurs between the source resonator and the target resonator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a resonator having increased isolation, the resonator includes a first resonator having first characteristics, and configured to resonate with another resonator having the first characteristics; and a second resonator having second characteristics different from the first characteristics, and configured to resonate with another resonator having the second characteristics; wherein the resonator has an arrangement and a structure that minimizes a coupling between the first resonator and the second resonator.

The arrangement and the structure may be an arrangement and a structure that minimize a value of an H-field surface integral of the first resonator.

The arrangement and the structure may be an arrangement and a structure in which the first resonator is divided into two areas in which mutual fluxes between the first resonator and the second resonator have opposite directions and absolute values that are the same or within a predetermined range of each other.

The first characteristics of the first resonator may be characteristics of a resonator configured to perform communication or an antenna configured to perform communication.

The first resonator may include a first area overlapping the second resonator; and a second area not overlapping the second resonator.

The arrangement and the structure may be an arrangement and a structure that minimize a value of an H-field surface integral of the second resonator.

The arrangement and the structure may be an arrangement and a structure in which the second resonator is divided into two areas in which mutual fluxes between the first resonator and the second resonator have opposite directions and absolute values that are the same or within a predetermined range of each other.

The second characteristics of the second resonator may be characteristics of a resonator configured to perform either one or both of wireless power transmission and wireless power reception.

The second resonator may include a first area overlapping the first resonator; and a second area not overlapping the first resonator.

The first characteristics of the first resonator may be characteristics of a resonator configured to perform communication or an antenna configured to perform communication; and the second characteristics of the second resonator may be characteristics of a resonator configured to perform either one or both of wireless power transmission and wireless power reception.

The first characteristics of the first resonator may be characteristics of a resonator configured to perform either one or both of wireless power transmission and wireless power reception; and the second characteristics of the second resonator may be characteristics of a resonator configured to perform communication or an antenna configured to perform communication.

In another general aspect, a resonator having increased isolation includes a first resonator; and a second resonator; wherein the first resonator is positioned relative to the second resonator to minimize a coupling between the first resonator and the second resonator.

The first resonator may be positioned relative to the second resonator to minimize a surface integral of a magnetic field in the first resonator generated by the second resonator.

The first resonator may be positioned relative to the second resonator so that the first resonator includes at least one first area overlapping the second resonator; and at least one second area not overlapping the second resonator.

A direction of a magnetic field in the at least one first area of the first resonator generated by the second resonator may be opposite to a direction of a magnetic field in the at least one second area of the first resonator generated by the second resonator; and an absolute value of a surface integral of the magnetic field in the least one first area may be equal to an absolute value of a surface integral of the magnetic field in the at least one second area, or within a predetermined range of the absolute value of the surface integral of the magnetic field in the at least one second area that provides the first resonator with a desired isolation relative to the second resonator.

The first resonator may have first resonance characteristics, and may be configured to resonate with another resonator having the first resonance characteristics; and the second resonator may have second resonance characteristics different from the first resonance characteristics, and may be configured to resonate with another resonator having the second resonance characteristics.

The first resonance characteristics of the first resonator may be resonance characteristics of a resonator configured to perform communication or an antenna configured to perform communication; and the second resonance characteristics of a resonator configured to perform either one or both of wireless power transmission and wireless power reception.

The first resonator may have first resonance characteristics, and may be configured to resonate with another resonator having the first resonance characteristics; and the second resonator may have second resonance characteristics different from the first resonance characteristics, and may be configured to resonate with another resonator having the second resonance characteristics.

The first resonance characteristics of the first resonator may be resonance characteristics of a resonator configured to perform communication or an antenna configured to perform communication; and the second resonance characteristics of the second resonator may be resonance characteristics of a resonator configured to perform either one or both of wireless power transmission and wireless power reception.

A resonant frequency of the first resonator may be different from a resonant frequency of the second resonator.

Other features and aspects will be apparent from the following detailed description, the drawings, and the claims.

DETAILED DESCRIPTION

Figure 1:
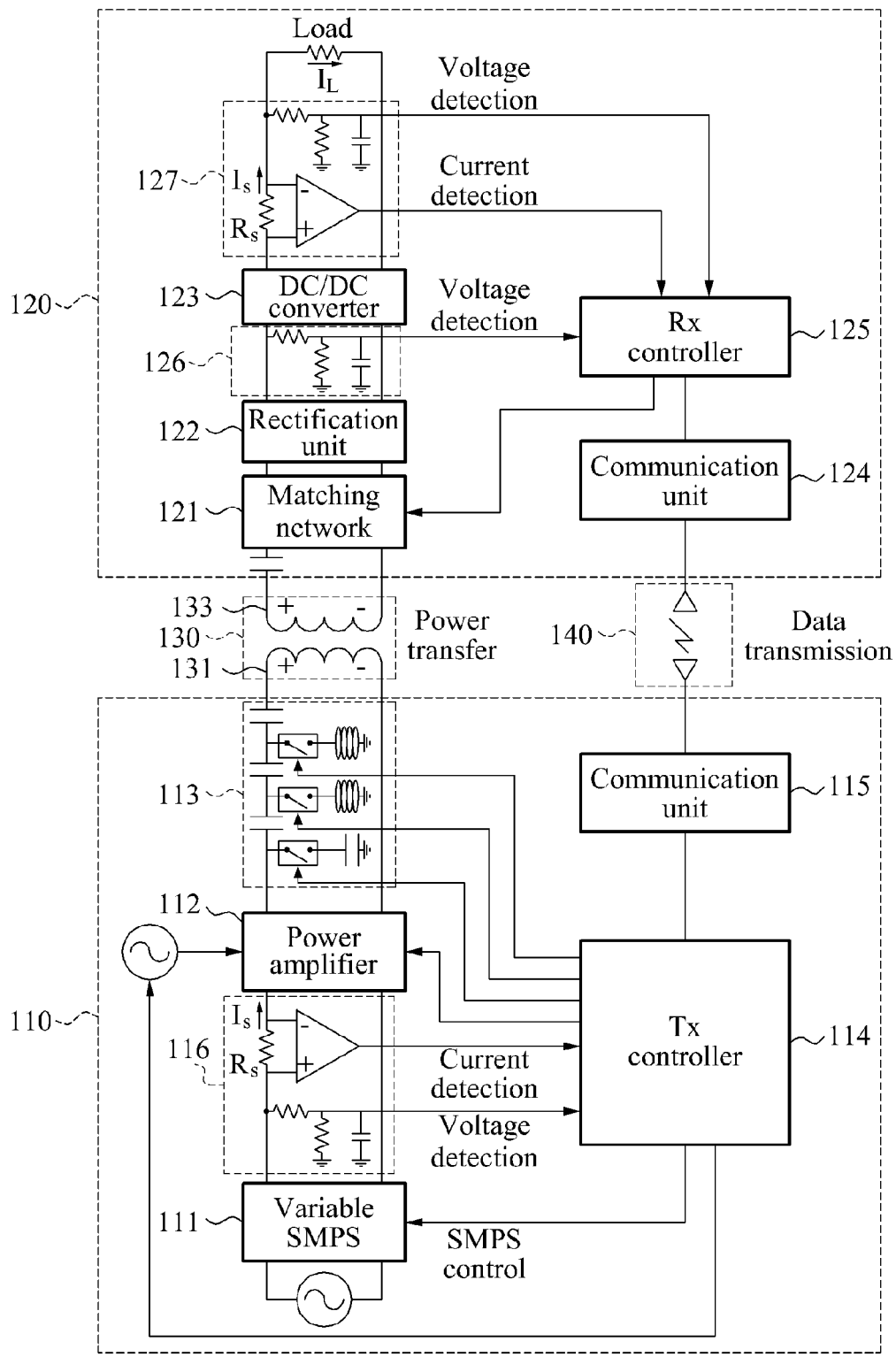
FIG. 1 illustrates an example of a wireless power transmission system.

The following detailed description is provided to assist the reader in gaining a comprehensive understanding of the methods, apparatuses, and/or systems described herein. However, various changes, modifications, and equivalents of the methods, apparatuses, and/or systems described herein will be to one of ordinary skill in the art. The sequences of operations described herein are merely examples, and are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Communication between a source and a target may be performed using either one or both of an in-band communication scheme and an out-of-band communication scheme. The in-band communication scheme refers to communication performed between the source and the target in the same frequency band that is used for power transmission. The out-of-band communication scheme refers to communication performed between the source and the target in a separate frequency band that is different from a frequency band used for power transmission.

FIG. 1 illustrates an example of a wireless power transmission system. Referring to FIG. 1, the wireless power transmission system includes a source 110 and a target 120. The source 110 is a device configured to supply wireless power, and may be any electronic device capable of supplying power, such as, for example, a pad, a terminal, a tablet personal computer (PC), a television (TV), a medical device, or an electric vehicle. The target 120 is a device configured to receive wireless power, and may be any electronic device requiring power to operate, such as, for example, a pad, a terminal, a tablet PC, a TV, a medical device, an electric vehicle, a washing machine, a radio, or a lighting system.

The source 110 includes a variable switching mode power supply (SMPS) 111, a power amplifier (PA) 112, a matching network 113, a transmission (TX) controller 114, such as, for example, TX control logic, a communication unit 115, and a power detector 116.

The variable SMPS 111 generates a direct current (DC) voltage by switching an alternating current (AC) voltage having a frequency in a band of tens of hertz (Hz) output from a power supply. The variable SMPS 111 may output a fixed DC voltage having a predetermined level, or may output an adjustable DC voltage having a level that may be adjusted by the TX controller 114.

The power detector 116 detects an output current and an output voltage of the variable SMPS 111, and provides information on the detected current and the detected voltage to the TX controller 114. Also, the power detector 116 may detect an input current and an input voltage of the power amplifier 112.

The power amplifier 112 generates power by converting a DC voltage having a predetermined level supplied to the PA 112 by the variable SMPS 111 to an AC voltage using a switching pulse signal having a frequency in a band of a few megahertz (MHz) to tens of MHz. For example, the power amplifier 112 may convert the DC voltage supplied to the power amplifier 112 to an AC voltage having a reference resonant frequency $F_{Ref}$, and may generate a communication power used for communication, or a charging power used for charging. The communication power and the charging power may be used in a plurality of targets.

The communication power may be a low power of 0.1 milliwatt (mW) to 1 mW. The charging power may be a high power of 1 mW to 200 W that is consumed by a device load of a target. As used herein, the term "charging" may refer to supplying power to a unit or an element that is configured to charge a battery or other rechargeable device. Also, the term "charging" may refer to supplying power to a unit or an element that is configured to consume power. For example, the term "charging power" may refer to a power consumed by a target while operating, or power used to charge a battery of the target. The units or elements may be for example, batteries, displays, sound output circuits, main processors, and various sensors.

As used herein, the term "reference resonant frequency" refers to a resonant frequency that is nominally used by the source 110, and the term "tracking frequency" refers to a resonant frequency used by the source 110 that has been adjusted based on a preset scheme.

The TX controller 114 may detect a reflected wave of the communication power or the charging power, and may detect mismatching that may occur between a target resonator 133 and a source resonator 131 based on the detected reflected wave. The TX controller 114 may detect the mismatching by detecting an envelope of the reflected wave, a power amount of the reflected wave, or any other characteristic of the reflected wave that is affected by mismatching.

The matching network 113 compensates for impedance mismatching between the source resonator 131 and the target resonator 133 to achieve optimal matching under the control of the TX controller 114. The matching network 113 includes a plurality of switches each connected to a capacitor or an inductor, and the switches are controlled by the TX controller 114 to achieve optimal matching.

The TX controller 114 may calculate a voltage standing wave ratio (VSWR) based on a voltage level of the reflected wave and a level of an output voltage of the source resonator 131 or the power amplifier 112. For example, if the TX controller 114 detects that the VSWR is greater than a predetermined value, the TX controller 114 may detect that there is mismatching between the source resonator 131 and the target resonator 133.

In another example, if the TX controller 114 detects that the VSWR is less than the predetermined value, the TX controller 114 may calculate a wireless power transmission efficiency for each of N tracking frequencies, determine a tracking frequency $F_{Best}$ providing the best wireless power transmission efficiency among the N tracking frequencies, and change the reference resonant frequency $F_{Ref}$ to the tracking frequency $F_{Best}$. The N tracking frequencies may be set in advance.

The TX controller 114 may adjust a frequency of the switching pulse signal used by the power amplifier 112. The frequency of the switching pulse signal may be determined by the TX controller 114. For example, by controlling the frequency of the switching pulse signal used by the power amplifier 112, the TX controller 114 may generate a modulated signal to be transmitted to the target 120. That is, the TX controller 114 may transmit a variety of data to the target 120 using in-band communication. Additionally, the TX controller 114 may detect a reflected wave, and may demodulate a signal received from the target 120 from an envelope of the detected reflected wave.

The TX controller 114 may generate the modulated signal for the in-band communication using various techniques. For example, the TX controller 114 may generate the modulated signal by turning the switching pulse signal used by the power amplifier 112 on and off, by performing delta-sigma modulation, or by any other modulation method known to one of ordinary skill in the art. Additionally, the TX controller 114 may generate a pulse-width modulated (PWM) signal having a predetermined envelope.

The communication unit 115 may perform out-of-band communication using a separate communication channel. The communication unit 115 may include a communication module, such as a ZigBee module, a Bluetooth module, or any other communication module known to one of ordinary skill in the art, that the communication unit 115 may use to perform the out-of-band communication. The communication unit 115 may transmit and receive data 140 to and from the target 120 via the out-of-band communication.

The source resonator 131 transmits electromagnetic energy 130 to the target resonator 133. For example, the source resonator 131 may transmit the communication power and/or the charging power to the target 120 via a magnetic coupling with the target resonator 133.

The target 120 includes a matching network 121, a rectifier 122, a DC/DC converter 123, a communication unit 124, a reception (RX) controller 125, such as, for example, RX control logic, a voltage detector 126, and a power detector 127.

The target resonator 133 receives the electromagnetic energy 130 from the source resonator 131. For example, the target resonator 133 may receive the communication power and/or the charging power from the source 110 via the magnetic coupling with the source resonator 131. Additionally, the target resonator 133 may receive a variety of data from the source 110 via the in-band communication.

The matching network 121 matches an input impedance viewed from the source 110 to an output impedance viewed from a load of the target 120. The matching network 121 may be configured to have at least one capacitor and at least one inductor.

The rectifier 122 generates a DC voltage by rectifying an AC voltage received from the target resonator 133.

The DC/DC converter 123 may adjust a level of the DC voltage output from the rectifier 122 based on a voltage required by the load. For example, the DC/DC converter 123 may adjust the level of the DC voltage output from the rectifier 122 to a level in a range of 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal may be used by the RX controller 125 to calculate a wireless power transmission efficiency of the power received from the source 110. The detected current and the detected voltage of the output terminal may be used by the RX controller 125 to calculate an amount of a power actually transferred to the load. The TX controller 114 of the source 110 may calculate an amount of power that needs to be transmitted by the source 110 to the target 120 based on an amount of power required by the load and the amount of power actually transferred to the load, and may control the power amplifier 112 to generate an amount power that will enable the calculated amount of power to be transmitted by the source 110.

If the amount of power actually transferred to the load calculated by the RX controller 125 is transmitted to the source 110 by the communication unit 124, the source 110 may calculate the amount of power that needs to be transmitted to the target 120.

The RX controller 125 may perform in-band communication to transmit and receive data using a resonant frequency. During the in-band communication, the RX controller 125 may demodulate a received signal by detecting a signal between the target resonator 133 and the rectifier 122, or detecting an output signal of the rectifier 122, and demodulating the detected signal. In other words, the RX controller 125 may demodulate a message received via the in-band communication.

Additionally, the RX controller 125 may adjust an impedance of the target resonator 133 using the matching network 121 to modulate a signal to be transmitted to the source 110. For example, the RX controller 125 may control the matching network 121 to increase the input impedance of the target resonator 133 so that a reflected wave will be detected by the TX controller 114 of the source 110. Depending on whether the reflected wave is detected, the TX controller 114 may detect a first value, for example, a binary number "0," or a second value, for example, a binary value "1." For example, when the reflected wave is detected, the TX controller 114 may detect "0", and when the reflected wave is not detected, the TX controller 114 may detect "1". Alternatively, when the reflected wave is detected, the TX controller 114 may detect "1", and when the reflected wave is not detected, the TX controller 114 may detect "0".

The communication unit 124 of the target 120 may transmit a response message to the communication unit 115 of the source 110. For example, the response message may include any one or any combination of a type of the target 120, information on a manufacturer of the target 120, a model name of the target 120, a battery type of the target 120, a charging scheme of the target 120, an impedance value of a load of the target 120, information on characteristics of the target resonator 133 of the target 120, information on a frequency band used by the target 120, an amount of power consumed by the target 120, an identifier (ID) of the target 120, information on a version or a standard of the target 120, and any other information on the target 120.

The communication unit 124 may perform out-of-band communication using a separate communication channel. For example, the communication unit 124 may include a communication module, such as a ZigBee module, a Bluetooth module, or any other communication module known to one of ordinary skill in the art, that the communication unit 115 may use to perform the out-of-band communication. The communication unit 124 may transmit and receive the data 140 to or from the source 110 via the out-of-band communication.

The communication unit 124 may receive a wake-up request message from the source 110, and the power detector 127 may detect an amount of power received by the target resonator 133. The communication unit 124 may transmit to the source 110 information on the detected amount of the power received by the target resonator 133. The information on the detected amount of the power received by the target resonator 133 may include, for example, an input voltage value and an input current value of the rectifier 122, an output voltage value and an output current value of the rectifier 122, an output voltage value and an output current value of the DC/DC converter 123, or any other information on the detected amount of the power received by the target resonator 133.

The TX controller 114 may set a resonance bandwidth of the source resonator 131. Based on the set resonance bandwidth of the source resonator 131, a Q-factor $Q_S$ of the source resonator 131 may be determined. For example, the TX controller 114 may set the resonance bandwidth of the source resonator 131 to be wider or narrower than the resonance bandwidth of the target resonator 133.

The RX controller 125 may set a resonance bandwidth of the target resonator 133. Based on the set resonance bandwidth of the target resonator 133, a Q-factor of the target resonator 133 may be determined. In this example, the RX controller 125 may set the resonance bandwidth of the target resonator 133 to be wider or narrower than the resonance bandwidth of the source resonator 131.

The source 110 and the target 120 may communicate with each other to share information about the resonance bandwidth of the source resonator 131 and the resonance bandwidth of the target resonator 133. In an example in which a power higher than a reference value is requested by the target 120, the Q-factor $Q_S$ of the source resonator 131 may be set to a value greater than 100. In another example in which a power lower than the reference value is requested by the target 120, the Q-factor $Q_S$ of the source resonator 131 may be set to a value less than 100.

In resonance-based wireless power transmission, the resonance bandwidth may be an important factor. A Q-factor Qt of energy coupling between the source resonator 131 and the target resonator 133 is affected by a change in a distance between the source resonator 131 and the target resonator 133, a change in a resonance impedance, impedance mismatching, a reflected signal, or any other factor affecting a Q-factor. Qt is inversely proportional to the resonance bandwidth as expressed by the following Equation 1.

$$\frac{\Delta f}{f_0} = \frac{1}{Qt} \qquad (1)$$

$$= \Gamma_{S,D} + \frac{1}{BW_S} + \frac{1}{BW_D}$$

In Equation 1, $f_0$ denotes a center frequency, $\Delta f$ denotes a bandwidth, $\Gamma_{S,D}$ denotes a reflection loss between the source resonator 131 and the target resonator 133, $BW_S$ denotes a resonance bandwidth of the source resonator 131, and $BW_D$ denotes a resonance bandwidth of the target resonator 133.

A wireless power transmission efficiency U of the wireless power transmission may be expressed by the following Equation 2.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \qquad (2)$$

In Equation 2, $\kappa$ denotes a coupling coefficient of energy coupling between the source resonator 131 and the target resonator 133, $\Gamma_S$ denotes a reflection coefficient of the source resonator 131, $\Gamma_D$ denotes a reflection coefficient of the target resonator 133, $\omega_0$ denotes a resonant frequency of the source resonator 131 and the target resonator 133, M denotes a mutual inductance between the source resonator 131 and the target resonator 133, $R_S$ denotes an impedance of the source resonator 131, $R_D$ denotes an impedance of the target resonator 133, $Q_S$ denotes a Q-factor of the source resonator 131, $Q_D$ denotes a Q-factor of the target resonator 133, and $Q_\kappa$ denotes a Q-factor of the energy coupling between the source resonator 131 and the target resonator 133, and is the same as Qt discussed above in connection with Equation 1.

As can be seen from Equation 2, the $Q_S$ and $Q_D$ have a great effect on the wireless power transmission efficiency U. Accordingly, to increase the wireless power transmission efficiency U, the Q-factors $Q_S$ and $Q_D$ may be set to high values. However, even when the Q-factors $Q_S$ and $Q_D$ are set to extremely high values, the wireless power transmission efficiency U may be reduced due to a change in the coupling coefficient $\kappa$ of energy coupling, a change in a distance between the source resonator 131 and the target resonator 133, a change in a resonance impedance, impedance mismatching, or a change in any other factor affecting the wireless power transmission efficiency U.

If the resonance bandwidths $BW_S$ and $BW_D$ of the source resonator 131 and the target resonator 133 are set to be very narrow to increase the wireless power transmission efficiency U, impedance mismatching between the source resonator 131 and the target resonator 133 may easily occur due to even a small external influence. In terms of impedance mismatching, Equation 1 may be rewritten as the following Equation 3.

$$\frac{\Delta f}{f_0} = \frac{\sqrt{VSWR} - 1}{Qt\sqrt{VSWR}} \qquad (3)$$

In an example in which an unbalanced relationship of a bandwidth of an impedance matching frequency or a resonance bandwidth between the source resonator 131 and the target resonator 133 is maintained, a decrease in the wireless power transmission efficiency may be prevented. The decrease in the wireless transmission efficiency may be a result of a change in the coupling coefficient κ of energy coupling, a change in the distance between the source resonator 131 and the target resonator 133, a change in the resonance impedance, impedance mismatching, or a change in any other factor affecting the wireless power transmission efficiency.

Based on Equations 1 through 3, an unbalanced relationship between the Q-factors $Q_S$ and $Q_D$ may be maintained in an example in which an unbalanced relationship of the bandwidth of the impedance matching frequency or the resonance bandwidth between the source resonator 131 and the target resonator 133 is maintained.

The source 110 may wirelessly transmit a wake-up power to wake up the target 120, and may broadcast a configuration signal to configure a wireless power transmission network. The source 110 may receive a search frame including a reception sensitivity of the configuration signal in the target 120 from the target 120, allow the target 120 to join the wireless power transmission network, and transmit an identifier (ID) identifying the target 120 in the wireless power transmission network to the target device 120. The source 110 may generate a charging power through power control, and wirelessly transmit the charging power to the target 120.

The target 120 may receive wake-up power from at least one of a plurality of sources, and activate a communication function using the wake-up power. The target 120 may receive a configuration signal to configure a wireless power transmission network from each of the plurality of sources, select one of the plurality of sources, and receive wireless power from the selected source. For example, the target 120 may select the source 110 based on a receiving sensitivity of the configuration signal received from the source 110 in the target 120, and receive wireless power from the selected source 110.

In the following description of FIGS. 2A, 2B, 3A, 3B, 4A, and 4B, unless otherwise indicated, the term "resonator" may refer to both a source resonator and a target resonator.

Figure 2A:
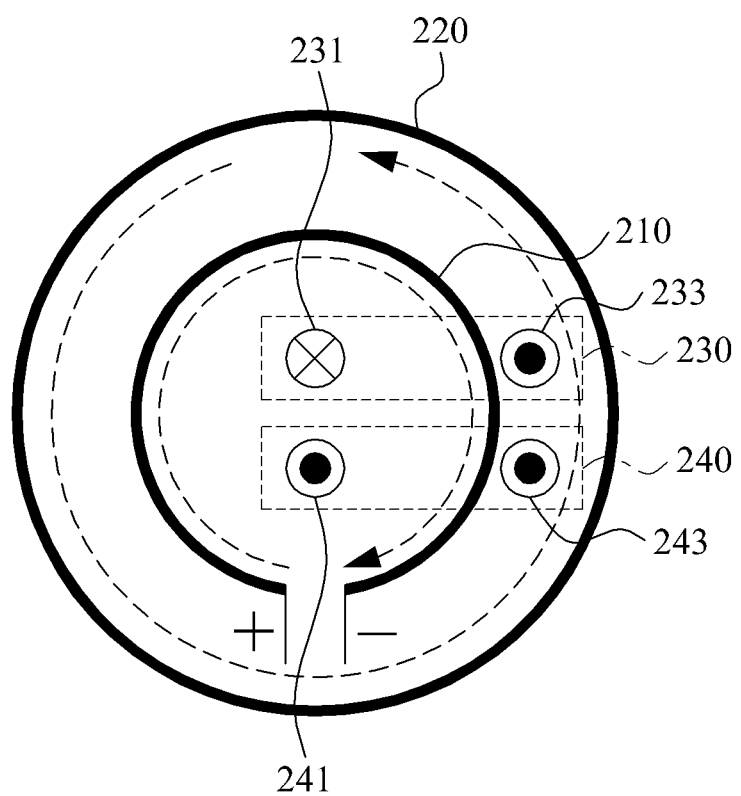
FIGS. 2A and 2B illustrate examples of a distribution of a magnetic field in a feeder and a resonator of a wireless power transmitter.
Figure 2B:
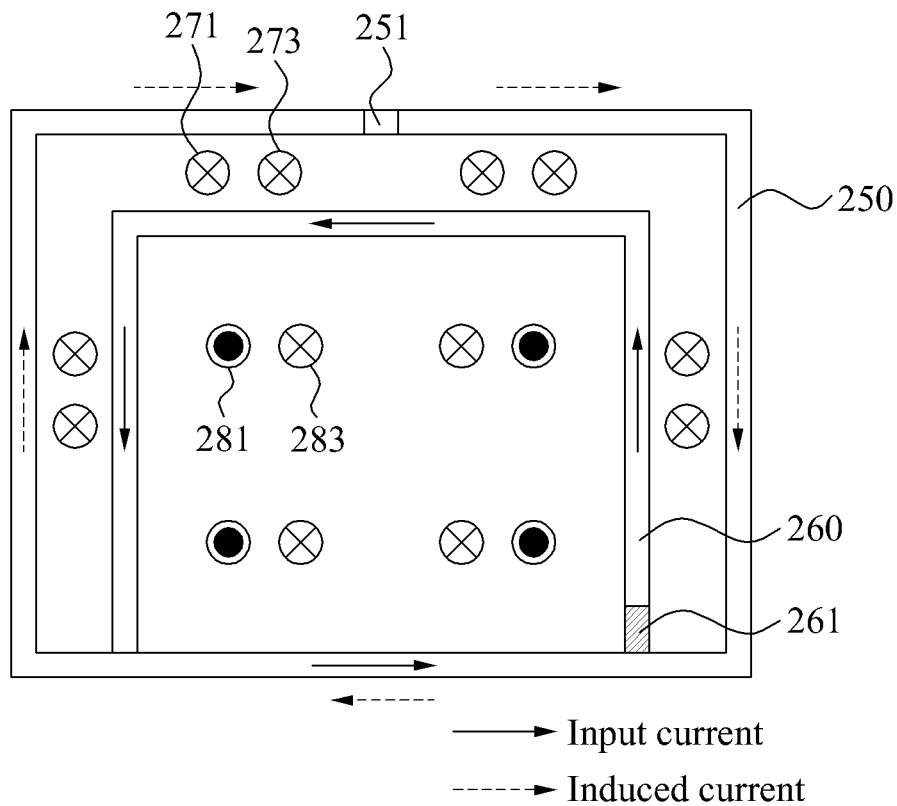

FIGS. 2A and 2B illustrate examples of a distribution of a magnetic field in a feeder and a resonator of a wireless power transmitter. When a resonator receives power supplied through a separate feeder, magnetic fields are generated in both the feeder and the resonator.

FIG. 2A illustrates an example of a structure of a wireless power transmitter in which a feeder 210 and a resonator 220 do not have a common ground. Referring to FIG. 2A, when an input current flows into the feeder 210 though a terminal labeled "+" and out of the feeder 210 through a terminal labeled "−", a magnetic field 230 is generated by the input current. A direction 231 of the magnetic field 230 inside the feeder 210 is into the plane of FIG. 2A, and is opposite to a direction 233 of the magnetic field 230 outside the feeder 210. The magnetic field 230 generated by the feeder 210 induces a current to flow in the resonator 220. The direction of the induced current in the resonator 220 is opposite to a direction of the input current in the feeder 210 as indicated by the dashed lines with arrowheads in FIG. 2A.

The induced current in the resonator 220 generates a magnetic field 240. Directions of the magnetic field generated by the resonator 220 are the same at all positions inside the resonator 220, and are out of the plane of FIG. 2A. Accordingly, a direction 241 of the magnetic field 240 generated by the resonator 220 inside the feeder 210 is the same as a direction 243 of the magnetic field 240 generated by the resonator 220 outside the feeder 210.

Consequently, when the magnetic field 230 generated by the feeder 210 and the magnetic field 240 generated by the resonator 220 are combined, a strength of the total magnetic field decreases inside the feeder 210, but increases outside the feeder 210. In an example in which power is supplied to the resonator 220 through the feeder 210 configured as illustrated in FIG. 2A, the strength of the total magnetic field decreases in the portion of the resonator 220 inside the feeder 210, but increases in the portion of the resonator 220 between the feeder 210 and the resonator 220. In another example in which a magnetic field is randomly or not uniformly distributed in the resonator 220, it may be difficult to perform impedance matching since an input impedance may frequently vary. Additionally, when the strength of the total magnetic field increases, a wireless power transmission efficiency increases. Conversely, when the strength of the total magnetic field decreases, the wireless power transmission efficiency decreases. Accordingly, the wireless power transmission efficiency is reduced on average when the magnetic field is randomly or not uniformly distributed in the resonator 220 compared to when the magnetic field is uniformly distributed in the resonator 220.

FIG. 2B illustrates an example of a structure of a wireless power transmitter in which a resonator 250 and a feeder 260 have a common ground. The resonator 250 includes a capacitor 251. The feeder 260 receives a radio frequency (RF) signal via a port 261. When the RF signal is input to the feeder 260, an input current is generated in the feeder 260. The input current flowing in the feeder 260 generates a magnetic field, and a current is induced in the resonator 250 by this magnetic field. Additionally, another magnetic field is generated by the induced current flowing in the resonator 250. In this example, a direction of the input current flowing in the feeder 260 is opposite to a direction of the induced current flowing in the resonator 250. Accordingly, in a region between the resonator 250 and the feeder 260, a direction 271 of the magnetic field generated by the input current is the same as a direction 273 of the magnetic field generated by the induced current, and thus the strength of the total magnetic field increases in the region between the resonator 250 and the feeder 260. Conversely, inside the feeder 260, a direction 281 of the magnetic field generated by the input current is opposite to a direction 283 of the magnetic field generated by the induced current, and thus the strength of the total magnetic field decreases inside the feeder 260. Therefore, the strength of the total magnetic field decreases in the portion of the resonator 250 inside the feeder 260, but increases in the portion of the resonator 250 between the feeder 260 and the resonator 250.

An input impedance may be adjusted by adjusting an internal area of the feeder 260. The input impedance refers to an impedance viewed in a direction from the feeder 260 to the resonator 250. When the internal area of the feeder 260 increases, the input impedance increases. Conversely, when the internal area of the feeder 260 decreases, the input impedance decreases. However, if the magnetic field is randomly or not uniformly distributed in the resonator 250, the input impedance may vary depending on a location of a target even if the internal area of the feeder 260 has been adjusted to adjust the input impedance to match an output impedance of a power amplifier for a specific location of the target device. Accordingly, a separate matching network may be needed to match the input impedance to the output impedance of the power amplifier. For example, when the input impedance increases, a separate matching network may be used to match the increased input impedance to a relatively low output impedance of the power amplifier.

Also, if a receiving resonator has the same configuration as the transmitting resonator 250, and a feeder of the receiving resonator has the same configuration as the feeder 260 of the transmitting resonator 260, a separate matching network may be needed because a direction of a current flowing in the receiving resonator will be opposite to a direction of an induced current flowing in the feeder of the receiving resonator.

Figure 3A:
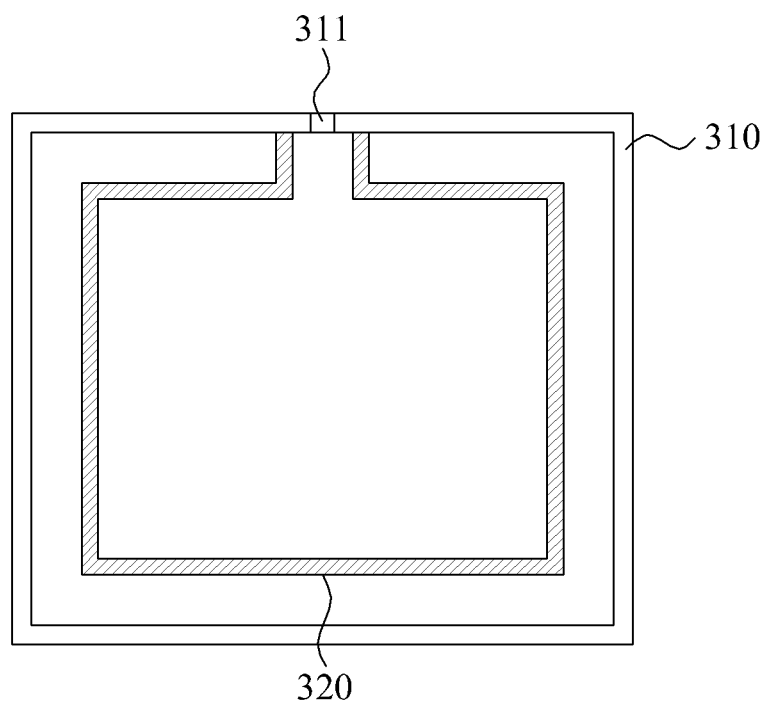
FIGS. 3A and 3B illustrate an example of a resonator and a feeder of a wireless power transmitter.
Figure 3B:
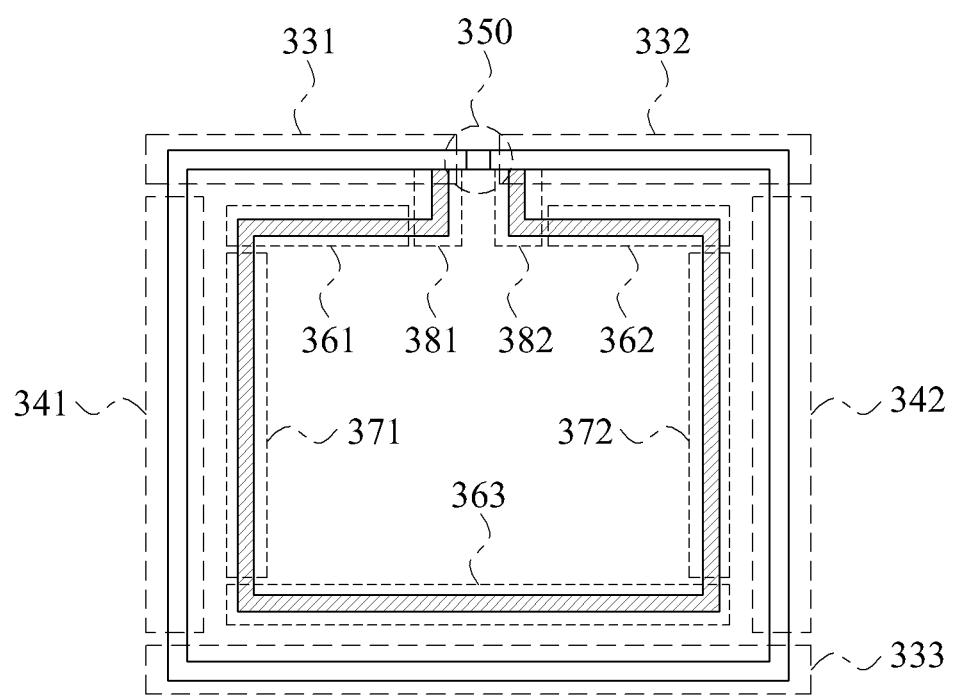

FIGS. 3A and 3B illustrate an example of a resonator and a feeder of a wireless power transmitter. Referring to FIG. 3A, the wireless power transmitter includes a resonator 310 and a feeder 320. The resonator 310 includes a capacitor 311. The feeder 320 is electrically connected to both ends of the capacitor 311.

FIG. 3B illustrates in greater detail a structure of the resonator and the feeder of the wireless power transmitter of FIG. 3A. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is inserted in series between a first signal conducting portion 331 and a second signal conducting portion 332, causing an electric field to be concentrated in the capacitor 350. Generally, a transmission line includes at least one conductor in an upper portion of the transmission line, and at least one conductor in a lower portion of the transmission line. A current may flow through the at least one conductor disposed in the upper portion of the transmission line, and the at least one conductor disposed in the lower portion of the transmission line may be electrically grounded. In this example, a conductor disposed in an upper portion of the first transmission line in FIG. 3B is separated into two portions that will be referred to as the first signal conducting portion 331 and the second signal conducting portion 332. A conductor disposed in a lower portion of the first transmission line in FIG. 3B will be referred to as a first ground conducting portion 333.

As illustrated in FIG. 3B, the resonator 310 has a generally two-dimensional (2D) structure. The first transmission line includes the first signal conducting portion 331 and the second signal conducting portion 332 in the upper portion of the first transmission line, and includes the first ground conducting portion 333 in the lower portion of the first transmission line. The first signal conducting portion 331 and the second signal conducting portion 332 are disposed to face the first ground conducting portion 333. A current flows through the first signal conducting portion 331 and the second signal conducting portion 332.

One end of the first signal conducting portion 331 is connected to one end of the first conductor 341, the other end of the first signal conducting portion 331 is connected to one end of the capacitor 350, and the other end of the first conductor 341 is connected to one end of the first ground conducting portion 333. One end of the second signal conducting portion 332 is connected to one end of the second conductor 342, the other end of the second signal conducting portion 332 is connected to the other end of the capacitor 350, and the other end of the second conductor 341 is connected to the other end of the first ground conducting portion 333. Accordingly, the first signal conducting portion 331, the second signal conducting portion 332, the first ground conducting portion 333, the first conductor 341, the second conductor 342, and the capacitor 350 are connected to each other, causing the resonator 310 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

The capacitor 350 may be inserted into an intermediate portion of the first transmission line. In the example in FIG. 3B, the capacitor 350 is inserted into a space between the first signal conducting portion 331 and the second signal conducting portion 332. The capacitor 350 may be configured as a lumped element capacitor, a distributed element capacitor, or any other type of capacitor known to one of ordinary skill in the art. For example, a distributed element capacitor may include zigzagged conductor lines and a dielectric material having a relatively high permittivity disposed between the zigzagged conductor lines.

The first capacitor 350 inserted into the first transmission line may cause the resonator 310 to have a characteristic of a metamaterial. A metamaterial is a material having a predetermined electrical property that is not found in nature, and thus may have an artificially designed structure. All materials existing in nature have a magnetic permeability and a permittivity. Most materials have a positive magnetic permeability and/or a positive permittivity.

For most materials, a right-hand rule may be applied to an electric field, a magnetic field, and a Poynting vector, so the materials may be referred to as right-handed materials (RHMs). However, a metamaterial that has a magnetic permeability and/or a permittivity that is not found in nature may be classified into an epsilon negative (ENG) material, a mu negative (MNG) material, a double negative (DNG) material, a negative refractive index (NRI) material, a left-handed (LH) material, any other metamaterial classification known to one of ordinary skill in the art based on a sign of the magnetic permeability of the metamaterial and a sign of the permittivity of the metamaterial.

If the capacitor 350 is a lumped element capacitor and a capacitance of the capacitor 350 is appropriately determined, the resonator 310 may have a characteristic of a metamaterial. If the resonator 310 is caused to have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth order resonance characteristic at the target frequency, and any other suitable criterion. Based on any one or any combination of the aforementioned criteria, the capacitance of the capacitor 350 may be appropriately determined.

The resonator 310, also referred to as the MNG resonator 310, may have a zeroth order resonance characteristic of having a resonant frequency when a propagation constant is "0". When the resonator 310 has a zeroth order resonance characteristic, the resonant frequency is independent of a physical size of the MNG resonator 310. By changing the capacitance of the capacitor 350, the resonant frequency of the MNG resonator 310 may be changed without changing the physical size of the MNG resonator 310.

In a near field, the electric field is concentrated in the capacitor 350 inserted into the first transmission line, causing the magnetic field to become dominant in the near field. The MNG resonator 310 may have a relatively high Q-factor when the capacitor 350 is a lumped element capacitor, and thereby increasing a wireless power transmission efficiency. The ( ) factor indicates a level of an ohmic loss or a ratio of a reactance to a resistance in the wireless power transmission. As will be understood by one of ordinary skill in the art, the wireless power transmission efficiency will increase as the Q-factor increases.

Although not illustrated in FIG. 3B, a magnetic core passing through the MNG resonator 310 may be provided to increase a wireless power transmission distance.

Referring to FIG. 3B, the feeder 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 in an upper portion of the second transmission line, and includes a second ground conducting portion 363 in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

One end of the third signal conducting portion 361 is connected to one end of the third conductor 371, the other end of the third signal conducting portion 361 is connected to one end of the fifth conductor 381, and the other end of the third conductor 371 is connected to one end of the second ground conducting portion 363. One end of the fourth signal conducting portion 362 is connected to one end of the fourth conductor 372, the other end of the fourth signal conducting portion 362 is connected to one end of the sixth conductor 382, and the other end of the fourth conductor 372 is connected to the other end of the second ground conducting portion 363. The other end of the fifth conductor 381 is connected to the first signal conducting portion 331 at or near where the first signal conducting portion 331 is connected to one end of the capacitor 350, and the other end of the sixth conductor 382 is connected to the second signal conducting portion 332 at or near where the second signal conducting portion 332 is connected to the other end of the capacitor 350. Thus, the fifth conductor 381 and the sixth conductor 382 are connected in parallel with both ends of the capacitor 350. In this example, the fifth conductor 381 and the sixth conductor 382 may be used as input ports to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to each other, causing the resonator 310 and the feeder 320 to have an electrically closed loop structure. The term "loop structure" includes, for example, a polygonal structure, a circular structure, a rectangular structure, and any other geometrical structure that is closed, i.e., a geometrical structure that does not have any opening in its perimeter. The expression "having a loop structure" indicates a structure that is electrically closed.

If an RF signal is input to the fifth conductor 381 or the sixth conductor 382, an input current flows through the feeder 320 and the resonator 310, generating a magnetic field that induces a current in the resonator 310. A direction of the input current flowing through the feeder 320 is the same as a direction of the induced current flowing through the resonator 310, thereby causing a strength of a total magnetic field to increase in the portion of the resonator 310 inside the feeder 320, but decrease in the portion of the resonator 310 between the feeder 320 and the resonator 310.

An input impedance is determined by an area of a region between the resonator 310 and the feeder 320. Accordingly, a separate matching network used to match the input impedance to an output impedance of a power amplifier may not be necessary. However, even if a matching network is used, the input impedance may be adjusted by adjusting a size of the feeder 320, and accordingly a structure of the matching network may be simplified. The simplified structure of the matching network may reduce a matching loss of the matching network.

The second transmission line, the third conductor 371, the fourth conductor 372, the fifth conductor 381, and the sixth conductor 382 of the feeder 320 may have a same structure as the resonator 310. For example, if the resonator 310 has a loop structure, the feeder 320 may also have a loop structure. As another example, if the resonator 310 has a circular structure, the feeder 320 may also have a circular structure.

Figure 4A:
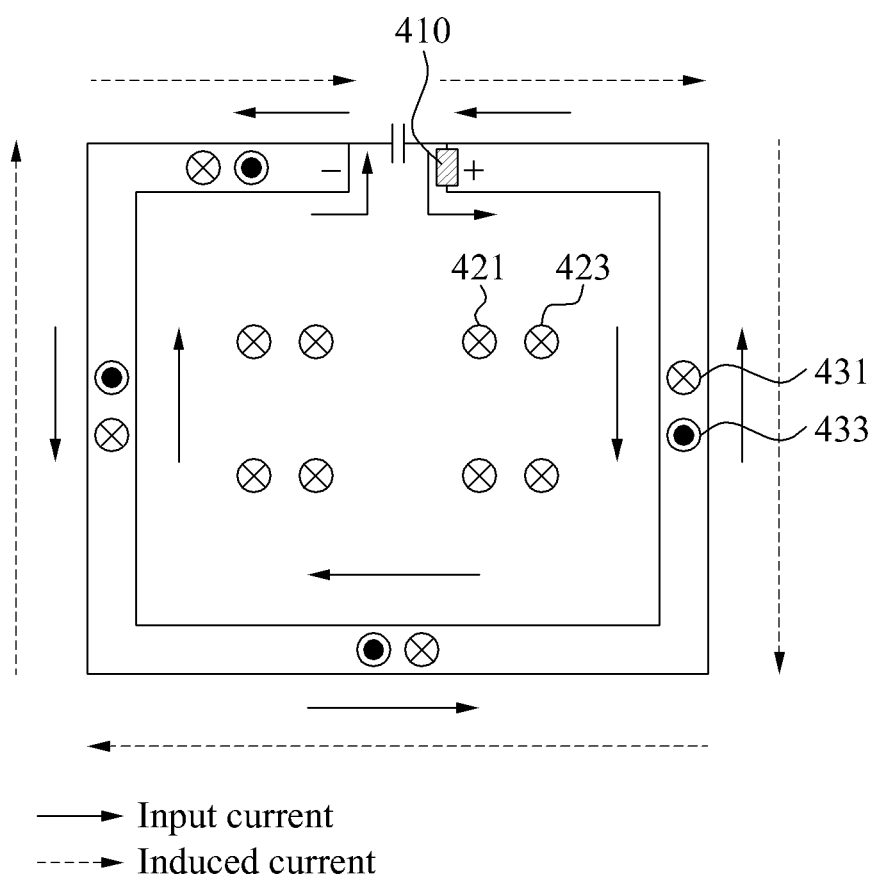
FIG. 4A illustrates an example of a distribution of a magnetic field inside a resonator produced by feeding a feeder.

FIG. 4A illustrates an example of a distribution of a magnetic field inside a resonator of a wireless power transmitter produced by feeding a feeder. FIG. 4A more simply illustrates the resonator 310 and the feeder 320 of FIGS. 3A and 3B, and the following description of FIG. 4A refers to reference numerals in FIGS. 3A and 3B.

A feeding operation may be an operation of supplying power to a source resonator in wireless power transmission, or an operation of supplying AC power to a rectifier in wireless power transmission. FIG. 4A illustrates a direction of an input current flowing in the feeder, and a direction of an induced current induced in the source resonator. Additionally, FIG. 4A illustrates a direction of a magnetic field generated by the input current of the feeder, and a direction of a magnetic field generated by the induced current of the source resonator.

Referring to FIG. 4A, the fifth conductor 381 or the sixth conductor 382 of the feeder 320 of FIG. 3A may be used as an input port 410. In FIG. 4A, the sixth conductor 382 of the feeder 320 is being used as the input port 410. The input port 410 may receive an RF signal as an input. The RF signal may be output from a power amplifier. The power amplifier may increase and decrease an amplitude of the RF signal based on a power requirement of a target device. The RF signal input to the input port 410 is represented in FIG. 4A as an input current flowing in the feeder 320. The input current flows in a clockwise direction in the feeder 1220 along the transmission line of the feeder 320. The fifth conductor 381 and the sixth conductor 382 of the feeder 320 are electrically connected to the resonator 310. More specifically, the fifth conductor 381 is connected to the first signal conducting portion 331 of the resonator 310, and the sixth conductor 382 is connected to the second signal conducting portion 332. Accordingly, the input current flows in both the resonator 310 and the feeder 320. The input current flows in a counterclockwise direction in the resonator 310 along the first transmission line of the resonator 310. The input current flowing in the resonator 310 generates a magnetic field, and the magnetic field induces a current in the resonator 310. The induced current flows in a clockwise direction in the resonator 310 along the first transmission line of the resonator 310. The induced current supplies energy to the capacitor 311 of the resonator 310, and also generates a magnetic field. In FIG. 4A, the input current flowing in the feeder 320 and the resonator 310 is indicated by solid lines with arrowheads, and the induced current flowing in the resonator 310 is indicated by dashed lines with arrowheads.

A direction of a magnetic field generated by a current may be determined based on the right-hand rule. As illustrated in FIG. 4A, inside the feeder 320, a direction 421 of the magnetic field generated by the input current flowing in the feeder 320 is the same as a direction 423 of the magnetic field generated by the induced current flowing in the resonator 310. Accordingly, a strength of a total magnetic field increases inside the feeder 320.

In contrast, as illustrated in FIG. 4A, in a region between the feeder 320 and the resonator 310, a direction 433 of the magnetic field generated by the input current flowing in the feeder 320 is opposite to a direction 431 of the magnetic field generated by the induced current flowing in the resonator 310. Accordingly, the strength of the total magnetic field decreases in the region between the feeder 320 and the resonator 310.

Typically, in a resonator having a loop structure, a strength of a magnetic field decreases in the center of the resonator, and increases near an outer periphery of the resonator. However, referring to FIG. 4A, since the feeder 320 is electrically connected to both ends of the capacitor 311 of the resonator 310, the induced current in the resonator 310 flows in the same direction as the input current in the feeder 320. Since the induced current in the resonator 310 flows in the same direction as the input current in the feeder 320, the strength of the total magnetic field increases inside the feeder 320, and decreases between the feeder 320 and the resonator 310. As a result, the strength of the total magnetic field increases in the center of the resonator 310 having the loop structure, and decreases near an outer periphery of the resonator 310 due to the influence of the feeder 320. Thus, the strength of the total magnetic field may be constant inside the resonator 310.

A wireless power transmission efficiency of transmitting wireless power from a source resonator to a target resonator is proportional to the strength of the total magnetic field generated in the resonator. Accordingly, when the strength of the total magnetic field increases in the center of the resonator due to the influence of the feeder 320, the wireless power transmission efficiency also increases.

Figure 4B:
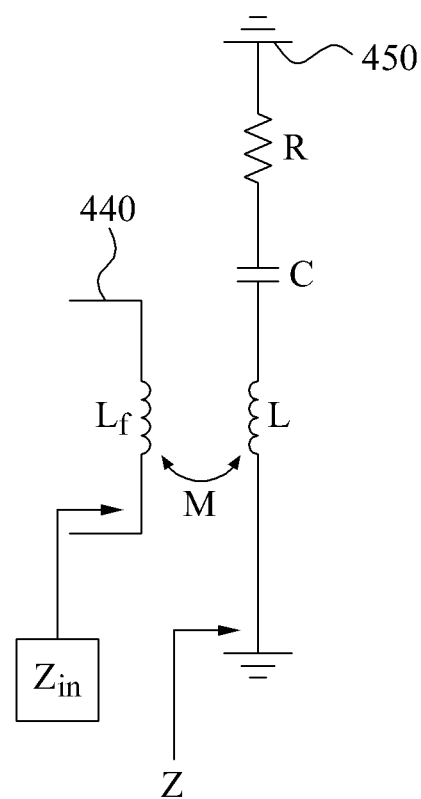
FIG. 4B illustrates an examples of equivalent circuits of a feeder and a resonator of a wireless power transmitter.

FIG. 4B illustrates an example of equivalent circuits of a feeder and a resonator of a wireless power transmitter. Referring to FIG. 4B, a feeder 440 and a resonator 450 may be represented by the equivalent circuits in FIG. 4B. The feeder 440 is represented as an inductor having an inductance $L_f$, and the resonator 450 is represented as a series connection of an inductor having an inductance L coupled to the inductance $L_f$ of the feeder 1340 by a mutual inductance M, a capacitor having a capacitance C, and a resistor having a resistance R. An input impedance $Z_{in}$ viewed in a direction from the feeder 440 to the resonator 450 may be expressed by the following Equation 4.

$$Z_{in} = \frac{(\omega M)^2}{Z} \qquad (4)$$

In Equation 4, M denotes a mutual inductance between the feeder 440 and the resonator 450, ω denotes a resonant frequency of the feeder 440 and the resonator 450, and Z denotes an impedance viewed in a direction from the resonator 450 to a target.

As can be seen from FIG. 4B, the input impedance $Z_{in}$ is proportional to the square of the mutual inductance M. Accordingly, the input impedance $Z_{in}$ may be adjusting by adjusting the mutual inductance M between the feeder 440 and the resonator 450. The mutual inductance M depends on an area of a region between the feeder 440 and the resonator 450. The area of the region between the feeder 440 and the resonator 450 may be adjusted by adjusting a size of the feeder 440, thereby adjusting the mutual inductance M and the input impedance $Z_{in}$. Since the input impedance $Z_{in}$ may be adjusted by adjusting the size of the feeder 440, it may be unnecessary to use a separate matching network to perform impedance matching with an output impedance of a power amplifier.

If the resonator 450 and the feeder 440 are used in a wireless power receiver with the resonator 450 operating as a target resonator, a magnetic field may be distributed as illustrated in FIG. 4A. For example, the target resonator may receive wireless power from a source resonator via magnetic coupling. The received wireless power induces a current in the target resonator. The induced current generates a magnetic field, which induces a current in the feeder 440. If the resonator 450 operating as the target resonator is connected to the feeder 440 as illustrated in FIG. 4A, the induced current flowing in the resonator 450 will flow in the same direction as the induced current flowing in the feeder 440. Accordingly, for the reasons discussed above in connection with FIG. 4A, a strength of the total magnetic field will increase inside the feeder 440, and will decrease in a region between the feeder 440 and the resonator 450.

Figure 5:
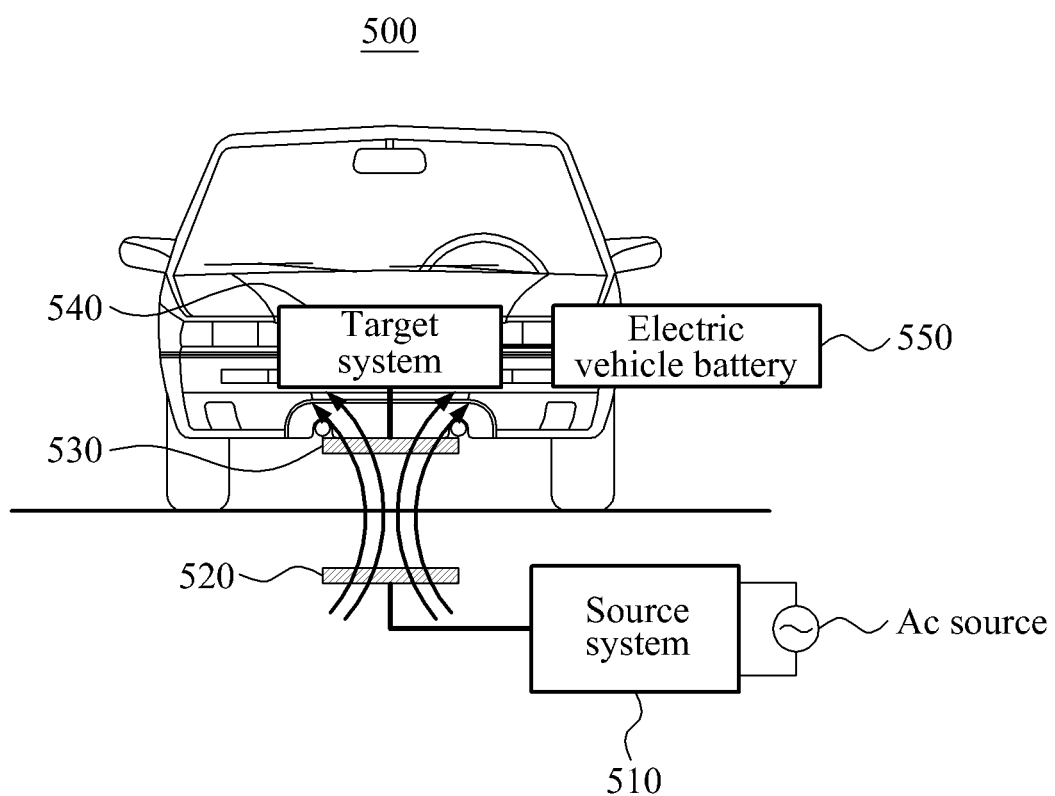
FIG. 5 illustrates an example of an electric vehicle charging system.

FIG. 5 illustrates an example of an electric vehicle charging system. Referring to FIG. 5, an electric vehicle charging system 500 includes a source system 510, a source resonator 520, a target resonator 530, a target system 540, and an electric vehicle battery 550.

In one example, the electric vehicle charging system 500 may have a similar structure to the wireless power transmission system of FIG. 1. The source system 510 and the source resonator 520 in the electric vehicle charging system 500 operate as a source. The target resonator 530 and the target system 540 in the electric vehicle charging system 500 operate as a target.

In one example, the source system 510 includes a variable SMPS, a power amplifier (PA), a matching network, a TX controller, a communication unit, and a power detector similar to those of the source 110 of FIG. 1. In one example, the target system 540 may include a matching network, a rectifier, a DC/DC converter, a communication unit, an RX controller, a voltage detector, and a power detector similar to those of the target 120 of FIG. 1. The electric vehicle battery 550 is charged by the target system 540. The electric vehicle charging system 500 may use a resonant frequency in a band of a few kilohertz (kHz) to tens of MHz.

The source system 510 generates power based on a type of the electric vehicle being charged, a capacity of the electric vehicle battery 550, and a charging state of the electric vehicle battery 550, and wirelessly transmits the generated power to the target system 540 via a magnetic coupling between the source resonator 520 and the target resonator 530.

The source system 510 may control an alignment of the source resonator 520 and the target resonator 530. For example, when the source resonator 520 and the target resonator 530 are not aligned with each other, the TX controller of the source system 510 may transmit a message to the RX controller of the target system 540 to may control the alignment of the source resonator 520 and the target resonator 530.

For example, when the target resonator 530 is not located in a position enabling maximum magnetic coupling, the source resonator 520 and the target resonator 530 are not properly aligned with each other. When the electric vehicle does not stop at a proper position to accurately align the source resonator 520 and the target resonator 530 with each other, the source system 510 may instruct a position of the electric vehicle to be adjusted to control the source resonator 520 and the target resonator 530 to be aligned with each other. However, this is merely an example, and other methods of aligning the source resonator and the target resonator with each other may be used The source system 510 and the target system 540 may transmit and receive an ID of an electric vehicle and exchange various messages by communicating with each other.

The descriptions of FIG. 1 through 4B may apply to the electric vehicle charging system 500. However, the electric vehicle charging system 500 may use a resonant frequency in a band of a few kHz to tens of MHz, and may wirelessly transmit power that is equal to or higher than tens of watts to charge the electric vehicle battery 550.

FIGS. 6A, 6B, 7A, and 7B illustrate examples of applications using a wireless power receiver and a wireless power transmitter.

Figure 6A:
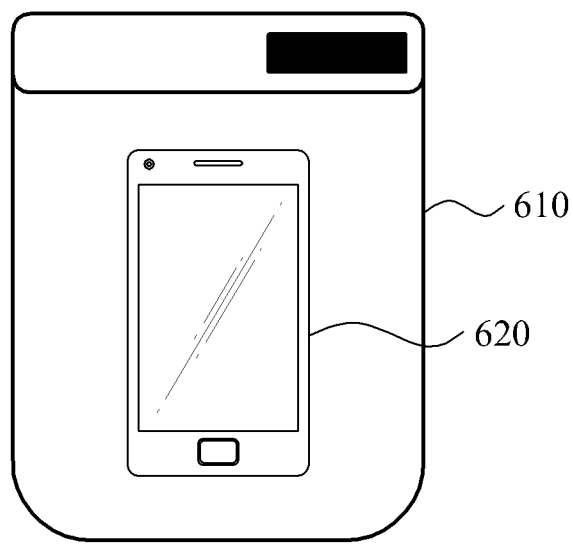
FIGS. 6A, 6B, 7A, and 7B illustrate examples of applications using a wireless power receiver and a wireless power transmitter.
Figure 6B:
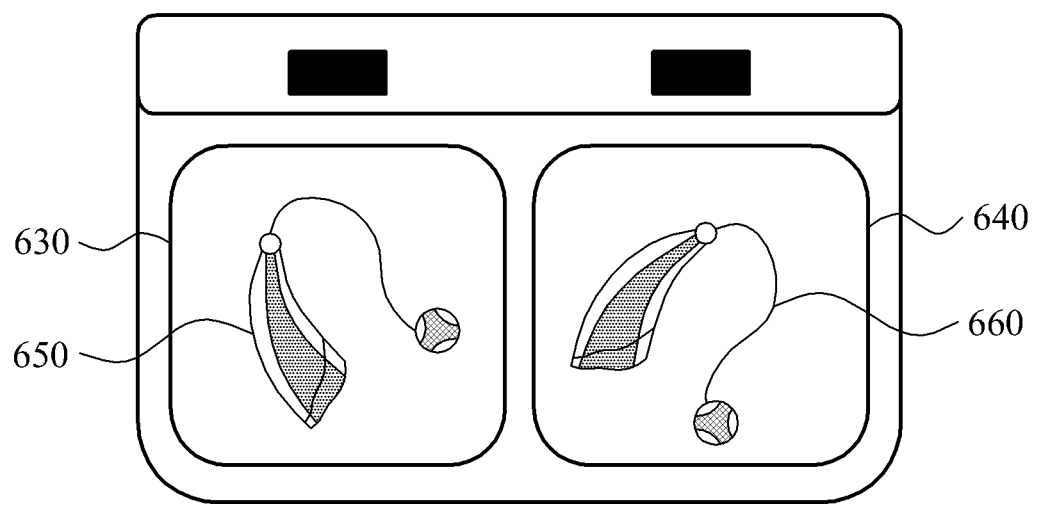

FIG. 6A illustrates an example of wireless power charging between a pad 610 and a mobile terminal 620, and FIG. 6B illustrates an example of wireless power charging between pads 630 and 640 and hearing aids 650 and 660.

In the example in FIG. 6A, a wireless power transmitter is mounted in the pad 610, and a wireless power receiver is mounted in the mobile terminal 620. The pad 610 is used to charge a single mobile terminal, namely the mobile terminal 620.

In the example in FIG. 6B, two wireless power transmitters are respectively mounted in the pads 630 and 640, and two wireless power receivers are respectively mounted in the hearing aids 650 and 660. The pads 630 and 640 are used to charge the hearing aids 650 and 660, respectively. The hearing aids 650 and 660 may be used for a left ear and a right ear, respectively.

Figure 7A:
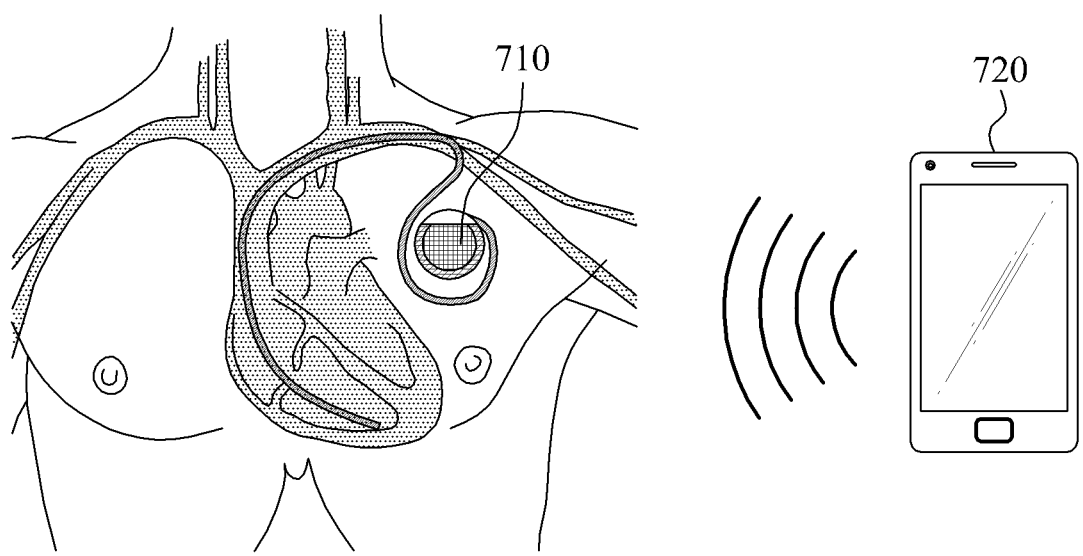
Figure 7B:
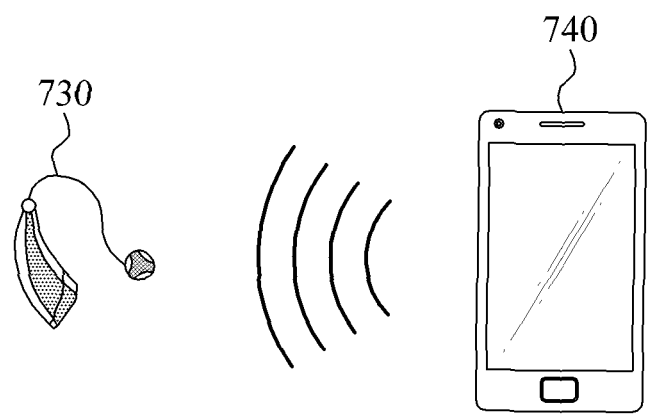

FIG. 7A illustrates an example of wireless power charging between an electronic device 710 that is inserted into a human body and a mobile terminal 720. FIG. 7B illustrates an example of wireless power charging between a hearing aid 730 and a mobile terminal 740.

In the example in FIG. 7A, a wireless power transmitter and a wireless power receiver are mounted in the mobile terminal 720, and a wireless power receiver is mounted in the electronic device 710 inserted in the body. The electronic device 710 inserted in the body is charged by power received from the mobile terminal 720.

In the example in FIG. 7B, a wireless power transmitter and a wireless power receiver are mounted in the mobile terminal 740, and a wireless power receiver is mounted in the hearing aid 730. The hearing aid 730 is charged by power received from the mobile terminal 740. Low-power electronic devices, such as Bluetooth earphones, may also be charged by power received from the mobile terminal 740.

Figure 8:
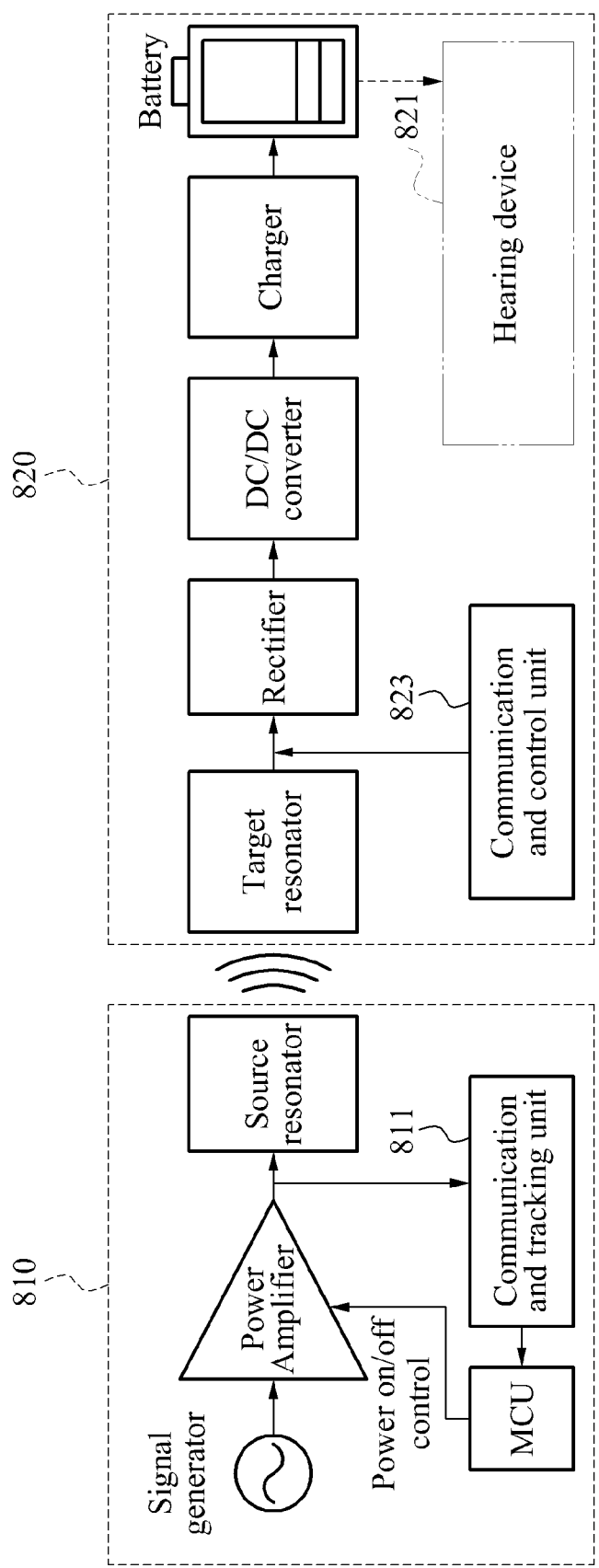
FIG. 8 illustrates an example of a wireless power receiver and a wireless power transmitter.

FIG. 8 illustrates an example of a wireless power transmitter and a wireless power receiver. A wireless power transmitter 810 of FIG. 8 may be mounted in the pad 610 of FIG. 6A, the pads 630 and 640 of FIG. 6B, the mobile terminal 720 of FIG. 7A, and the mobile terminal 740 of FIG. 7B.

A wireless power receiver 820 of FIG. 8 may be mounted the mobile terminal 620 of FIG. 6A, the hearing aids 650 and 660 of FIG. 6B, the electronic device 710 and the mobile terminal 720 of FIG. 7A, and the hearing aid 730 and the mobile terminal 740 of FIG. 7B.

The wireless power transmitter 810 may have a configuration similar to the configuration of the source 110 of FIG. 1. For example, the wireless power transmitter 810 may include a unit configured to wirelessly transmit power via magnetic coupling.

In the example in FIG. 8, the wireless power transmitter 810 includes a signal generator, a power amplifier (PA), a communication and tracking unit 811, a micro control unit (MCU), and a source resonator. The signal generator generates a signal having a resonant frequency of the source resonator. The communication and tracking unit 811 communicate with the wireless power receiver 820, and controls an input impedance and a resonant frequency to maintain a wireless power transmission efficiency. The communication and tracking unit 811 and the MCU perform functions similar to the functions performed by the communication unit 115 and the TX controller 114 of FIG. 1.

The wireless power receiver 820 may have a configuration similar to the configuration of the target 120 of FIG. 1. For example, the wireless power receiver 820 may include a unit configured to wirelessly receive power and charge a battery with the received power.

In the example in FIG. 8, the wireless power receiver 820 includes a target resonator, a rectifier, a DC/DC converter, a charger, a battery, and a communication and control unit 823. The communication and control unit 823 communicates with the wireless power transmitter 810, and performs an operation to protect a device powered by the wireless power receiver 820 from overvoltage and overcurrent.

The wireless power receiver 820 may include a hearing device 821. The hearing device 821 may be powered by the battery. The hearing device 821 may include a microphone, an analog-to-digital converter (ADC), a processor, a digital-to-analog converter (DAC), and a receiver. For example, the hearing device 821 may have the same configuration as a hearing aid.

Figure 9:
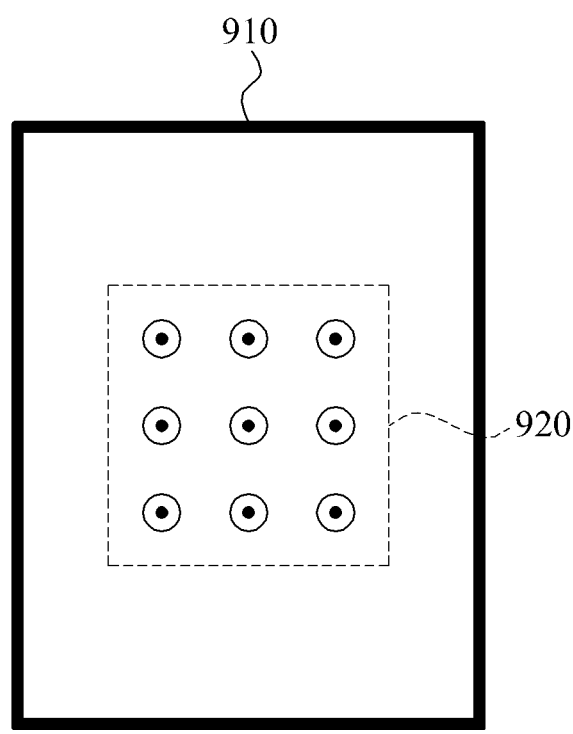
FIG. 9 illustrates an example of a structure of a resonator.

FIG. 9 illustrates an example of a structure of a resonator. Referring to FIG. 9, a first resonator 910 is disposed in a second resonator 920. The first resonator 910 and the second resonator 920 may be resonators having different characteristics, the first resonator 910 may resonate with a resonator having the same characteristics as the first resonator 910, and the second resonator 920 may resonate with a resonator having the same characteristics as the second resonator 920. For example, the first resonator 910 may be a resonator for communication or an antenna for communication having resonance characteristics, and may resonate with a resonator having the same resonance characteristics as the first resonator 910. The second resonator 920 may be a resonator for either one or both of wireless power transmission and wireless power reception having resonance characteristics, and may resonate with a resonator having the same resonance characteristics as the second resonator 920. The resonance characteristics of the second resonator 920 may be different from the resonance characteristics of the first resonator 910.

As the development of information technology (IT) has progressed, various portable electronic products have been introduced. In such an environment, a number of portable electronic products owned and carried by each individual may increase. As portable electronic products have become diverse and complex, the charging of such devices has become an issue. Although the portable electronic devices may transmit data wirelessly, power cables have been necessary to supply power to the devices for charging.

Accordingly, wireless power transmission technologies for supplying power without the use of power cables are being developed. When the wireless power transmission technologies are implemented, energy may be supplied wirelessly, eliminating the need for a wired charging system currently being used. Through wireless power transmission, an environment in which devices may be charged at any time and any location may be established, and power may be shared between devices without a power supply. In addition, environmental pollution caused by used batteries may be prevented.

However, in a case in which a resonator for either one or both of wireless power transmission and wireless power reception is mounted in a portable communication device, such as, for example, a cellular phone, if the resonator and an antenna for communication, which is a resonator at a communication frequency, are not sufficiently isolated from each other, characteristics of the resonator and the antenna may be changed or performance may deteriorate due to a mutual influence between the resonator and the antenna. Accordingly, it is necessary to increase the isolation between the two resonators.

When a first resonator 920 is disposed in a second resonator 910 as illustrated in FIG. 9, a mutual flux between the first resonator 920 and the second resonator 910 may be expressed by the following Equation 5.

$$\Phi = \mu \int_S \overline{H}_{in} \cdot d\overline{S} \quad (5)$$

In Equation 5, $\Phi$ denotes a magnetic flux measured in webers (Wb), $\mu$ denotes a magnetic permeability measured in henries per meter (H/m), $\overline{H}_{in}$ denotes a strength of a magnetic field generated in the first resonator 920 inside the second resonator 910 measured in amperes per meter (A/m), S denotes a surface through which the magnetic field passes, and $d\overline{S}$ denotes an infinitesimal element of the surface S. Thus, $\Phi$ is $\mu$ times the surface integral of $\overline{H}_{in}$ over the surface S.

In the example in FIG. 9, $\overline{H}_{in}$ has only one direction. Since only $\overline{H}_{in}$ having only one direction is present in Equation 5, the magnetic flux $\Phi$ is not offset by any magnetic flux having an opposite direction, so coupling may occur between the first resonator 920 and the second resonator 910. Accordingly, the isolation between the first resonator 920 and the second resonator 910 may decrease.

In an S-parameter simulation for a case in which resonant frequencies of the first resonator 920 and the second resonator 910 in FIG. 9 are the same or different from each other, the first resonator 920 may be set to be a first port, and the second resonator 910 may be set to be a second port. In the simulation, a value of a parameter $S_{21}$ representing the isolation between the first resonator 920 and the second resonator 910 may be −14.5 decibels (dB) when the resonant frequencies of the first resonator 920 and the second resonator 910 are different from each other, and may be −3.1 dB when the resonant frequencies of the first resonator 920 and the second resonator 910 are the same. An issue of isolation may be more serious when the resonant frequencies of the first resonator 920 and the second resonator 910 are the same, as compared to when the resonant frequencies of the first resonator 920 and the second resonator 910 are different from each other. In this instance, the coupling between the first resonator and the second resonator may be minimized through arrangements and structures of a resonator as illustrated, for example, in FIGS. 10 and 11A through 11C.

Figure 10:
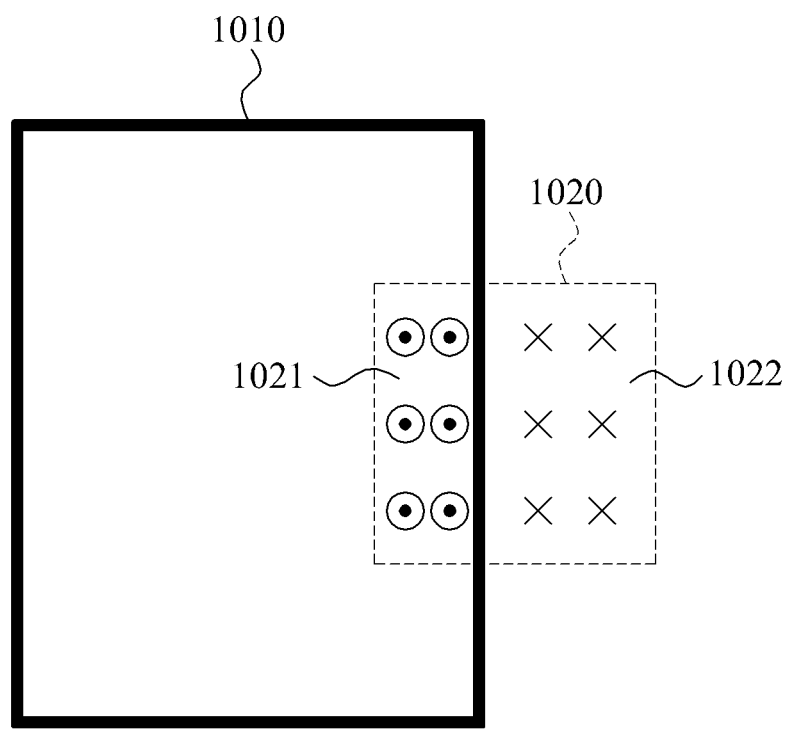
FIG. 10 illustrates another example of a structure of a resonator.

FIG. 10 illustrates another example of a structure of a resonator. Referring to FIG. 10, a first resonator 1020 is disposed both inside and outside a second resonator 1010. Referring to FIG. 10, the resonator is configured so that the first resonator 1020 is disposed both inside and outside the second resonator 1010. An area of the first resonator 1020 inside the second resonator 1010 is a first area 1021 overlapping the second resonator 1010, and an area of the first resonator 1020 outside the second resonator 1010 is a second area 1022 not overlapping the second resonator 1010. In this example, a mutual flux between the first resonator 1020 and the second resonator 1010 may be expressed by the following Equation 6.

$$\Phi = \mu \int_S \overline{H}_{in} \cdot d\overline{S} + \mu \int_S \overline{H}_{out} \cdot d\overline{S} \quad (6)$$

In Equation 6, $\Phi$, $\mu$, S, and $d\overline{S}$ have the same meanings that they have in Equation 5 discussed above. $\overline{H}_{in}$ denotes a strength of a magnetic field that is generated in the first area 1021 of the first resonator 1020 inside the second resonator 1010 measured in A/m, and $\overline{H}_{out}$ denotes a strength of a magnetic field that is generated in the second area 1022 of the first resonator 1020 outside the second resonator 1010 measured in A/m. Thus, $\Phi$ is the sum of $\mu$ times the surface integral of $\overline{H}_{in}$ over the surface S and $\mu$ times the surface integral of $\overline{H}_{out}$ over the surface S.

In the example in FIG. 10, a direction of $\overline{H}_{in}$ is opposite to a direction of $\overline{H}_{out}$. Accordingly, in Equation 6 for the example in FIG. 10, a sign of the surface integral of $\overline{H}_{in}$ will be opposite to a sign of the surface integral of $\overline{H}_{out}$, so the magnetic flux $\Phi$ will be the difference between $\mu$ times the surface integral of $\overline{H}_{in}$ over the surface S and $\mu$ times the surface integral of $\overline{H}_{out}$ over the surface S. Therefore, if the absolute value of the surface integral of $\overline{H}_{in}$ is equal to the absolute value of the surface integral of $\overline{H}_{out}$, the coupling and the mutual flux between the first resonator 1020 and the second resonator 1010 will be zero, and therefore the isolation between the first resonator 1020 and the second resonator 1010 will greatly increase. Alternatively, the absolute value of the surface integral of $\overline{H}_{in}$ may be within a predetermined range of the absolute value of the surface integral of $\overline{H}_{out}$. The predetermined range may be a range that provides a desired isolation between the first resonator 1020 and the second resonator 1010.

In an S-parameter simulation in which resonant frequencies of the first resonator 1020 and the second resonator 1010 in FIG. 10 are the same or different from each other, the first resonator 1020 may be set to be a first port, and the second resonator 1010 may be set to be a second port. In the simulation, a value of a parameter $S_{21}$ representing the isolation between the first resonator 1020 and the second resonator 1010 may be −54.3 dB when the resonant frequencies of the first resonator 1020 and the second resonator 1010 are different from each other, and may be −52.4 dB when the resonant frequencies of the first resonator 1020 and the second resonator 1010 are the same. Thus, excellent isolation characteristics may be achieved, irrespective of the resonant frequencies of the first resonator 1020 and the second resonator 1010. Compared to the resonator of FIG. 9, the isolation between the first resonator 1020 and the second resonator 1010 may increase by about 40 dB when the resonant frequencies of the first resonator 1020 and the second resonator 1010 are different from each other, and the isolation between the first resonator 1020 and the second resonator 1010 may increase by about 50 dB when the resonant frequencies of the first resonator 1020 and the second resonator 1010 are the same.

Figure 11A:
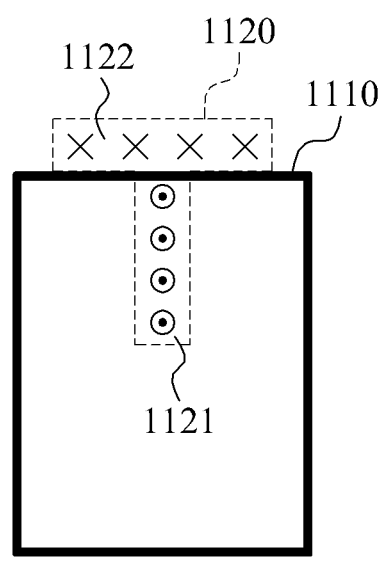
FIGS. 11A through 11C illustrate other examples of a structure of a resonator.
Figure 11B:
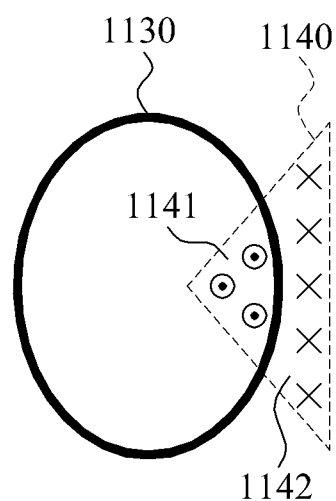
Figure 11C:
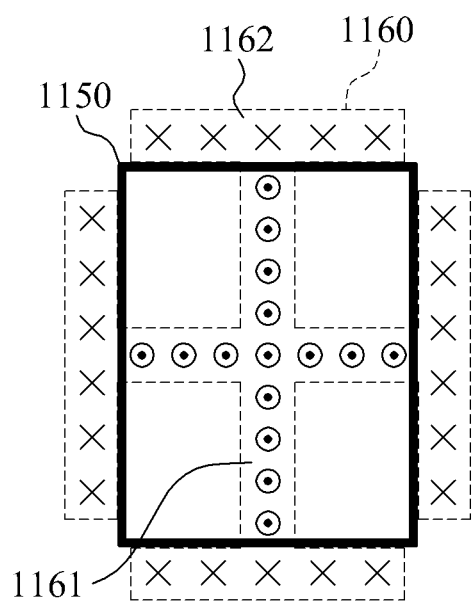

FIGS. 11A through 11C illustrate other examples of a structure of a resonator. Referring to FIGS. 11A through 11C, various examples of an arrangement and a structure of first resonators 1120, 1140, and 1160 and second resonators 1110, 1130, and 1150 are illustrated.

The resonators illustrated in FIGS. 11A through 11C have arrangements and structures for physically minimizing a coupling between a first resonator and a second resonator. A structure of a first resonator and a second resonator is not limited to any particular structure. As an example, a T-shaped first resonator 1120 may overlap a rectangular second resonator 1110 as illustrated in FIG. 11A. As another example, a triangular first resonator 1140 may overlap an elliptical second resonator 1130 as illustrated in FIG. 11B. As another example, a cross-shaped first resonator 1160 may overlap a rectangular second resonator 1150 as illustrated in FIG. 11C.

For example, the resonators in FIGS. 11A through 11C may be designed to minimize a value of a surface integral of a magnetic field of the first resonator 1120, 1140, and 1160, for example, an H-field of the first resonator 1120, 1140, and 1160 produced by a magnetic field $\overline{H}_{in}$ generated in a first area 1121, 1141, and 1161 of the first resonator 1120, 1140, and 1160 inside the second resonator 1110, 1130, and 1150, and the absolute value of a surface integral of a magnetic field $\overline{H}_{out}$ generated in a second area 1122, 1142, and 1162 of the first resonator 1120, 1140, and 1150 outside the second resonator 1110, 1130, and 1150. For example, the resonators may be designed so that mutual fluxes in the first area and the second area of the first resonator have opposite directions and the same value or almost the same value. In particular, the absolute values of the mutual fluxes in the first area and the second area of the first resonator may be equal to each other or within a predetermined range of each other. The predetermined range may be a range that provides a desired isolation between the first resonator 1120, 1140, and 1160 and the second resonator 1110, 1130, and 1150.

In the examples in FIGS. 10 and 11A through 11C, a first resonator has been divided into an area in which the first resonator overlaps a second resonator, and an area in which the first resonator does not overlap the second resonator. As another example, the second resonator may be divided into an area in which the second resonator overlaps the first resonator, and an area in which the second resonator does not overlap the first resonator. The resonator may be designed to have an arrangement and a structure that minimizes a value of an H-field surface integral of the second resonator. In particular, the resonator may be designed so that mutual fluxes in the first area and the second area of the second resonator have opposite directions, and absolute values of the mutual fluxes in the first area and the second area are equal to each other or within a predetermined other range of each other to minimize a coupling between the first resonator and the second resonator so that a desired isolation between the first resonator and the second resonator may be obtained.

As another example, an isolation between a resonator for wireless power transmission and a resonator/antenna for communication may be increased using the techniques described above with respect to FIGS. 10 and 11A-11C. By adding the resonator for wireless power transmission and the resonator/antenna for communication designed using the techniques described above with respect to FIGS. 10 and 11A-11C to a conventional communication device, a change in characteristics of the resonator for wireless power transmission and the resonator/antenna for communication or a deterioration in performance caused by a mutual influence of the resonator for wireless power transmission and the resonator/antenna for communication may be prevented. In addition, regardless of whether resonant frequencies of the resonator for wireless power transmission and the resonator/antenna for communication are the same or different from each other, isolation between the resonator for wireless power transmission and the resonator/antenna for communication may be obtained.

The TX controller 114, the communication units 115 and 124, the RX controller 125, the MCU, the communication and tracking unit 811, and the communication and control unit 823 in FIGS. 1 and 8 described above may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A resonator apparatus having increased isolation, the resonator apparatus comprising:
   a first resonator; and
   a second resonator;
   wherein the resonator apparatus has an arrangement and a structure that minimize a coupling between the first resonator and the second resonator,
   wherein the first resonator comprises:
   a first area overlapping the second resonator; and
   a second area not overlapping the second resonator, and
   wherein the arrangement and the structure cause a value of an H-field surface integral of the first resonator to be within a predetermined range.

2. The resonator apparatus of claim 1, wherein the arrangement and the structure are an arrangement and a structure in which the first resonator is divided into two areas in which mutual fluxes between the first resonator and the second resonator have opposite directions and absolute values that are the same or within a predetermined range of each other.

3. The resonator apparatus of claim 1, wherein the first resonator is configured to perform communication.

4. The resonator apparatus of claim 1, wherein the arrangement and the structure minimize a value of an H-field surface integral of the second resonator.

5. The resonator apparatus of claim 1, wherein the arrangement and the structure are an arrangement and a structure in which the second resonator is divided into two areas in which mutual fluxes between the first resonator and the second resonator have opposite directions and absolute values that are the same or within a predetermined range of each other.

6. The resonator apparatus of claim 1, wherein the second resonator is configured to perform either one or both of wireless power transmission and wireless power reception.

7. The resonator apparatus of claim 1, wherein the second resonator comprises:
   a third area overlapping the first resonator; and
   a fourth area not overlapping the first resonator.

8. The resonator apparatus of claim 1, wherein the first resonator is configured to perform either one or both of wireless power transmission and wireless power reception; and the second resonator is configured to perform communication.

9. A resonator apparatus having increased isolation, the resonator apparatus comprising:

a first resonator; and a second resonator;

wherein the first resonator is positioned relative to the second resonator to minimize a coupling between the first resonator and the second resonator, wherein the first resonator comprises:

at least one first area overlapping the second resonator; and at least one second area not overlapping the second resonator, and wherein the first resonator is positioned relative to the second resonator to minimize a surface integral of a magnetic field in the first resonator generated by the second resonator within a predetermined range.

10. The resonator apparatus of claim 9, wherein a direction of a first magnetic field in the at least one first area of the first resonator generated by the second resonator is opposite to a direction of a second magnetic field in the at least one second area of the first resonator generated by the second resonator; and an absolute value of a surface integral of the first magnetic field in the at least one first area is equal to an absolute value of a surface integral of the second magnetic field in the at least one second area, or within a predetermined range of the absolute value of the surface integral of the second magnetic field in the at least one second area that provides the first resonator with a desired isolation relative to the second resonator.

11. The resonator apparatus of claim 9, wherein the first resonator is configured to perform communication; and the second resonator is configured to perform either one or both of wireless power transmission and wireless power reception.

12. The resonator apparatus of claim 9, wherein a resonant frequency of the first resonator is different from a resonant frequency of the second resonator.

* * * * *